United States Patent
Koller

(10) Patent No.: US 10,270,140 B2
(45) Date of Patent: Apr. 23, 2019

(54) CONNECTION APPARATUS AND METHOD FOR CONTROLLING THE TEMPERATURE OF BATTERY CELLS, AND TEMPERATURE-CONTROL APPARATUS, BATTERY MODULE, BATTERY PACK, BATTERY AND BATTERY SYSTEM

(71) Applicant: Robert Bosch GmbH, Stuttgart (DE)

(72) Inventor: Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 616 days.

(21) Appl. No.: 14/636,383

(22) Filed: Mar. 3, 2015

(65) Prior Publication Data
US 2015/0255835 A1   Sep. 10, 2015

(30) Foreign Application Priority Data
Mar. 5, 2014   (DE) .................. 10 2014 203 943

(51) Int. Cl.
*H01M 10/61* (2014.01)
*H01M 10/613* (2014.01)
(Continued)

(52) U.S. Cl.
CPC .......... *H01M 10/613* (2015.04); *B23P 15/26* (2013.01); *F16L 19/02* (2013.01);
(Continued)

(58) Field of Classification Search
None
See application file for complete search history.

(56) References Cited

U.S. PATENT DOCUMENTS

| | | | |
|---|---|---|---|
| 2010/0279159 A1 | 11/2010 | Meintschel et al. | |
| 2015/0086831 A1* | 3/2015 | Haussmann | H01M 10/625 429/120 |

FOREIGN PATENT DOCUMENTS

| | | |
|---|---|---|
| CN | 102067367 A | 5/2011 |
| CN | 102576834 A | 7/2012 |

(Continued)

*Primary Examiner* — Daniel S Gatewood
(74) *Attorney, Agent, or Firm* — Michael Best & Friedrich LLP

(57) ABSTRACT

Connection apparatus ($500$; $500_1$, $500_2$) for controlling the temperature of a battery cell ($100_1$, $100_2$), characterized by: a fastening device for fastening the connection apparatus ($500$; $500_1$, $500_2$) to a temperature-control element ($400$; $400_1$, $400_2$) which comprises a channel for accommodating a temperature-control medium, and a connection device ($510$; $510_1$, $510_2$), which comprises a channel for accommodating the temperature-control medium, for connection of a connecting line ($600_{11}$, $600_{12}$, $600_{21}$, $600_{22}$) to an opening in the channel of the connection device ($510$; $510_1$, $510_2$), wherein: the connection apparatus ($500$; $500_1$, $500_2$) can be fastened to the temperature-control element ($400$; $400_1$, $400_2$) in such a way that a further opening in the channel of the connection device ($510$; $510_1$, $510_2$) is aligned with an opening in the channel of the temperature-control element ($400$; $400_1$, $400_2$).

17 Claims, 3 Drawing Sheets

(51) Int. Cl.
  *H01M 10/65* (2014.01)
  *H01M 10/6568* (2014.01)
  *H01M 10/6556* (2014.01)
  *H01M 10/647* (2014.01)
  *H01M 10/64* (2014.01)
  *F16L 19/02* (2006.01)
  *B23P 15/26* (2006.01)
  *F16L 33/22* (2006.01)
  *H01M 10/617* (2014.01)

(52) U.S. Cl.
  CPC ... *H01M 10/6556* (2015.04); *H01M 10/6568* (2015.04); *F16L 33/227* (2013.01); *H01M 10/617* (2015.04); *H01M 10/647* (2015.04); *H01M 2220/20* (2013.01); *Y10T 29/4935* (2015.01)

(56) References Cited

FOREIGN PATENT DOCUMENTS

| | | | | |
|---|---|---|---|---|
| CN | 102576916 A | 7/2012 | | |
| DE | 102008059955 | 6/2010 | | |
| DE | 102008059955 A1 * | 6/2010 | ........ | H01M 10/0525 |
| DE | 102010056204 A1 * | 9/2011 | ............ | B60L 3/0046 |
| DE | 102011082991 | 3/2013 | | |
| DE | 102012005871 | 9/2013 | | |
| WO | 13115312 | 8/2013 | | |
| WO | WO 2013115312 A1 * | 8/2013 | ............ | H01M 2/021 |

\* cited by examiner

CONNECTION APPARATUS AND METHOD FOR CONTROLLING THE TEMPERATURE OF BATTERY CELLS, AND TEMPERATURE-CONTROL APPARATUS, BATTERY MODULE, BATTERY PACK, BATTERY AND BATTERY SYSTEM

BACKGROUND OF THE INVENTION

It can be foreseen that new battery systems, for example with rechargeable lithium-ion batteries, rechargeable lithium-polymer batteries or rechargeable nickel-metal hydride batteries, will increasingly be used as rechargeable electrical energy stores (EES) both in stationary applications, for example in wind power plants, and also in mobile applications, for example in electric motor vehicles (electric vehicles, EV) or hybrid vehicles (hybrid electric vehicles, HEV).

Rechargeable lithium-ion batteries comprise a positive electrode (cathode) and a negative electrode (anode), which electrodes can reversibly incorporate lithium ions (Li+) during charging (intercalation) or expel said lithium ions again during discharging (deintercalation). Rechargeable lithium-ion batteries have a high energy density and a low level of self-discharge.

The battery systems have to meet very stringent requirements in respect of the usable energy content, the degree of charging/discharging efficiency, the reliability, the service life and the undesired loss of capacity due to frequent partial discharging.

A battery system comprises a large number of battery cells. The battery cells heat up during charging and discharging on account of their cell internal resistance and the electrochemical processes which take place. The battery cells can be connected in series in order to increase the electrical voltage, and/or can be connected in parallel in order to increase the maximum electric current. In this case, the battery cells can be combined to form battery units or battery modules. By way of example, three to twelve battery cells can be combined in one battery module. The battery module holds the battery cells and absorbs mechanical stresses, and therefore it protects the battery cells against damage. Furthermore, the battery module can be used to control the temperature of the battery cells. In addition, the battery module can mechanically brace the battery cells and provide electrical insulation. The battery modules can be combined to form a battery pack. When used for driving vehicles, it is possible for, for example, approximately 100 battery cells (in the form of a traction battery) to be connected in series or in parallel. The total voltage can therefore be, for example, 450 V or even 600 V in a high-voltage battery system.

The temperature range which is permissible for operating the battery cells is typically between −30° C. and +70° C., preferably between +5° C. and +35° C. The performance of the battery cells can fall considerably in the lower range of the operating temperature. At temperatures below approximately 0° C., the internal resistance of the battery cells increases greatly, and the performance and the degree of efficiency of the battery cells continuously fall as temperatures fall further. Irreversible damage to the battery cells can also occur in the process. The performance of the battery cells can also fall considerably when the operating temperature is exceeded. The service life of the battery cells is reduced at temperatures over approximately 40° C. Irreversible damage to the battery cells can likewise occur in the process. Furthermore, the difference in temperature (temperature gradient), which is permissible for operating the battery cells, in a battery cell and/or within a battery module or a battery is typically between 5 Kelvins and 10 Kelvins. Different regions of a battery cell or different battery cells of a battery module or of a battery can be subject to different loadings or even be (partially) overloaded and/or damaged in the event of relatively large differences in temperature. Furthermore, there is a risk of condensation water forming in the battery on account of differences in temperature and/or changes in temperature. The damage can lead to accelerated aging of the battery cells or to thermal runaway of the battery cells, this posing a risk to people and the environment.

In a hybrid drive train of a vehicle, lithium-ion high-rupture-capacity battery cells are operated with very high dynamics. During brief peak loadings, which arise, for example, due to recuperation of braking energy during braking or boost support during acceleration, the battery cells have to absorb a high power within a very short time (during charging) or output a high power in a very short time (during discharging). On account of the internal resistance of the battery cells, these short peak loadings lead to significant heating of the battery cells. The degree of efficiency of the battery cells during charging and discharging is very high (approximately 95%); nevertheless, the waste heat which arises in the process is not negligible. At a traction power of, for example, 60 KW, a loss of 5% results in a loss of power of 3 KW. Furthermore, for example in the summer months or in warmer regions, external temperatures which may be 40° C. and more may lie outside the permissible temperature range, and therefore the battery cells cannot achieve the required service life of, for example, ten or 15 years without cooling.

In order to ensure the reliability, functioning and service life of the battery module or battery system, it is therefore necessary to operate the battery cells within the prespecified temperature range. Firstly, as described above, heat which has to be dissipated in order to prevent the battery cells heating up beyond the critical maximum temperature is produced during operation of the battery cells. Secondly, it may be necessary to heat up the battery cells to a minimum temperature at low temperatures. In order to maintain the prespecified temperature range, the temperature of the battery module or battery system is controlled, that is to say said battery module or battery system is cooled or heated according to requirements, with cooling generally being required more frequently than heating.

For this purpose, the battery module or battery system can comprise a fluid, for example a liquid, such as alcohol, for example propane-1,2,3-triol (glycerol, glycerine), oil or water, a liquid mixture or a coolant as the temperature-control medium, for example coolant or refrigerant in a temperature-control-medium circuit.

By way of example, the temperature of the battery cells can be controlled by temperature-control elements, for example temperature-control plates, on which the battery cells are fitted. By way of example, the temperature-control elements comprise an at least partially hollow body which is composed of a material with a high level of thermal conductivity, for example a metal such as aluminum, and connection ports which are composed of the same material and are soldered onto the body. In the temperature-control elements, for example either a coolant, such as cooling water (air/heat radiator) or a refrigerant, which evaporates due to the heat, (evaporator) absorbs the heat from the battery cells and dissipates said heat to the surrounding area or an air-conditioning system (air conditioning, AC) by means of a radiator or another heat-exchange device. In addition to the temperature-control elements or the evaporator and the heat exchanger or radiator, a temperature-control system further comprises tubes and/or pipes, for example which are composed of plastic or metal such as aluminum, for connecting the temperature-control elements, the evaporator, the heat exchanger and/or the radiator. Therefore, the connection ports which are composed of aluminum can for example be connected to a tube system which is composed of plastic. These connections can be subject to a great deal of stress under changing thermal and hydraulic conditions. However, very stringent requirements are placed on the leaktightness of the cooling system in this case.

DE 10 2011 082 991 A1 already discloses a battery comprising a battery housing, temperature-control elements and a lithium-ion cell which is in direct contact with one of the temperature-control elements.

In order to improve the functionality of battery modules and to reduce the costs of the battery modules, it is therefore necessary to allow further improvement of the temperature-control system.

SUMMARY OF THE INVENTION

The apparatuses and methods according to the invention have the advantage that the leaktightness of the connections between the tube system and the element, for example temperature-control element, which is connected to it can be improved. In this case, the leaktightness of a single connection can be increased, even under changing thermal and hydraulic conditions. Furthermore, the number of possible leakage points can be reduced by reducing the number of connections. Furthermore, it is possible to dispense with the use of rapid-action connectors, supporting sleeves and clips. Therefore, fitting can be simplified and the fitting times can be reduced. In addition, checks and tests, for example at the end of the production process (end-of-line test, EoL test) can be simplified. Furthermore, already existing, in particular validated and/or tested, connection technologies such as pipe/port connection technologies which are composed of plastic and are already used, for example, in petrol pumps, can be used for the connections. As a result, the variety of variants can be reduced and economies of scale can be exploited. Therefore, the costs, for example development costs, validation costs, procurement costs including costs for selecting and checking suppliers, storage costs, manufacturing costs and/or test costs, can be reduced.

The material of the connection device can expediently be different from the material of the temperature-control element. As a result, the connection between the connection apparatus and the tube system (connecting line) can be matched to one another or optimized. In this case, the connection between the connection device and the temperature-control element can be controlled by means of the fastening device.

The material of the connection device can expediently correspond to the material of the connecting line or be matched to the material of the connecting line. As a result, the leaktightness, durability and reliability of the connection between the connection apparatus and the connecting line can be improved or increased. Furthermore, connection systems or interfaces which have already proven effective and have been tried out and/or certified can be used for the connection, for example with respect to configuration and/or materials.

The material of the connection device can expediently comprise plastic. Production, processing and/or fitting of the connection device can be improved or simplified as a result. Furthermore, the weight of the connection device or a temperature-control apparatus, which can comprise a large number of connection devices, can be reduced. Therefore, costs, for example manufacturing costs and/or operating costs, can be reduced.

The fastening device can expediently comprise a latching arm, spring arm or clip. As a result, fitting can be performed more rapidly and/or without tools, such as screwdrivers. Therefore, fitting of the connection apparatus can be improved or simplified. As a result, costs, for example manufacturing costs, material costs and/or fitting costs, can be reduced.

The connection device can expediently be integrally formed. As a result, the leaktightness, durability and reliability of the connection device can be improved or increased. Furthermore, the number of components can be reduced. As a result, fitting of the connection device can be improved or simplified. Therefore, costs, for example manufacturing costs, material costs and/or fitting costs, can be reduced.

The connection apparatus can expediently be integrally formed. As a result, the stability, durability and reliability of the connection apparatus can be improved or increased. Furthermore, the number of components can be further reduced. As a result, fitting of the connection apparatus can be improved or simplified. Therefore, costs, for example manufacturing costs, material costs and/or fitting costs, can be reduced.

The connection apparatus can expediently further comprise a guide device, for example a centering lug and/or a centering hole for orienting the connection apparatus on the temperature-control element and/or the further opening in the channel of the connection device with the opening in the channel of the temperature-control element. As a result, fitting of the connection apparatus can be further improved or simplified.

The connection apparatus can expediently further comprise a seal, for example a sealing ring or an O-ring. As a result, the leaktightness and reliability of the connection apparatus can be improved or increased.

The invention provides a temperature-control apparatus which comprises the above-described connection apparatus.

The invention further provides a battery module which comprises the above-described connection apparatus or the above-described temperature-control apparatus.

The invention further provides a battery pack which comprises the above-described connection apparatus, the above-described temperature-control apparatus or the above-described battery module.

The invention further provides a battery which comprises the above-described connection apparatus, the above-described temperature-control apparatus, the above-described battery module or the above-described battery pack.

The invention further provides a battery system which comprises the above-described connection apparatus, the above-described temperature-control apparatus, the above-described battery module, the above-described battery pack or the above-described battery.

The invention further provides a vehicle, in particular a motor vehicle such as an electric motor vehicle, hybrid vehicle or electric motorcycle (electric bike, E-bike), an electric bicycle (pedal electric cycle, pedelec), a watercraft, such as an electric boat or a submersible vehicle (submarine), an aircraft or a spacecraft, which vehicle or craft comprises the connection apparatus which is described above and is associated with the vehicle, the temperature-control apparatus which is described above and is associated with the vehicle, the battery module which is described above and is associated with the vehicle, the battery pack which is described above and is associated with the vehicle, the battery which is described above and is associated with the vehicle, or the battery system which is described above and is associated with the vehicle.

BRIEF DESCRIPTION OF THE DRAWINGS

Further features and advantages of the present invention will become apparent to a person skilled in the art from the following description of exemplary embodiments which, however, should not be interpreted as limiting the invention, with reference to the appended drawings.

DETAILED DESCRIPTION

Figure 1:
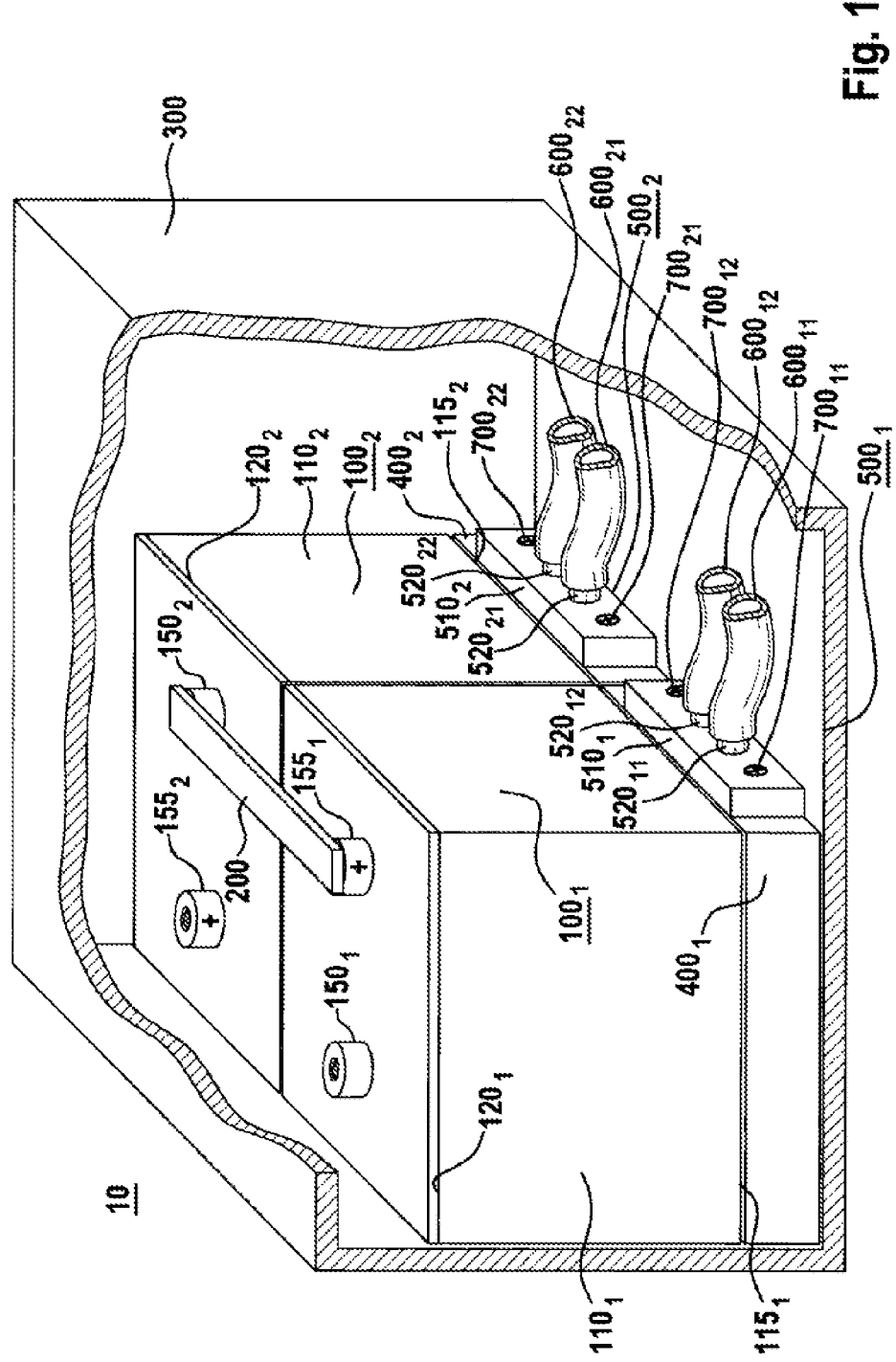
FIG. 1 shows, partially in section, a schematic perspective view of a battery 10 according to one embodiment of the invention.

FIG. 1 shows, partially in section, a schematic perspective view of a battery 10 according to one embodiment of the invention.

The battery 10 comprises a large number of battery cells $100_1 \ldots 100_2$, for example two, three, four or more battery cells. The battery cells $100_1 \ldots 100_2$ are, as shown by way of example in FIG. 1, oriented in a first direction in space, so that their longitudinal sides, which are oriented in a second direction in space which is perpendicular to the first direction in space, run parallel to one another. A third direction in space, which is perpendicular to the first direction in space and the second direction in space, indicates the vertical direction of the battery cells $100_1 \ldots 100_2$ when used as intended.

A battery module, a battery pack, a battery or a battery system can accordingly comprise a large number of battery cells.

The battery cells $100_1 \ldots 100_2$ can be prismatic, for example cuboidal, and can each comprise a cell housing $110_1 \ldots 110_2$, in each case having a cell base $115_1 \ldots 115_2$, and a cell cover $120_1 \ldots 120_2$, in each case having two electrical cell connections (cell terminals) $150_1, 155_1 \ldots 150_2, 155_2$, for example which are composed of aluminum, copper or steel. The cell terminals $150_1 \ldots 150_2$ can each form a negative electrical pole, and the cell terminals $155_1 \ldots 155_2$ can each, as shown by way of example in FIG. 1, form a positive electrical pole. For the purpose of electrical connection, the electrical cell connections $150_1, 155_1 \ldots 150_2, 155_2$ can, for example, each comprise a threaded hole. For the purpose of electrical connection of the battery cells $100_1 \ldots 100_2$ to form a battery module, use can be made of a connecting piece, for example a cell connector 200, for example which is composed of aluminum, copper or steel, which electrically connects the cell connections $150_1, 155_1 \ldots 150_2, 155_2$ of the battery cells $100_1 \ldots 100_2$ to one another in accordance with the respective requirement. FIG. 1 shows, by way of example, a series circuit of the battery cells $100_1 \ldots 100_2$. For the purpose of producing the battery module, the connecting pieces can be welded, for example depending on the spatial orientation of the battery cells $100_1 \ldots 100_2$, to the cell connections, for example by means of a laser.

The battery cells $100_1 \ldots 100_2$ can be designed as primary cells or primary elements, which are not rechargeable, or as secondary cells, which are rechargeable. The secondary cells can be designed, for example, as rechargeable lithium-ion batteries (rechargeable lithium batteries, rechargeable lithium-ion batteries, rechargeable Li-ion batteries, secondary lithium-ion batteries) or rechargeable lithium-polymer batteries (rechargeable LiPoly batteries, rechargeable LiPo batteries). The battery cells $100_1 \ldots 100_2$ can be designed with an electrode winding (jelly roll, JR, swiss roll), for example in the form of a rechargeable lithium-ion battery with an electrode winding (rechargeable JR-Li-ion battery). The battery cells $100_1 \ldots 100_2$ can be designed as a pouch cell. In this case, a pouch, which serves for receiving and storing an electrolyte, can comprise one, two, three or more electrode windings. Furthermore, a protective envelope can enclose the electrode winding or the electrode windings and/or the pouch or the pouches. The protective envelope can comprise a durable (impact-resistant, bulletproof, shot-proof, bombardment-proof, ballistic, anti-ballistic) material, for example a ballistic fabric, such as a ballistic polyamide fabric (ballistic nylon fabric, ballistic nylon). The electrode windings can therefore be protected against damage from the outside, for example in the event of an accident, and/or in the event of thermal runaway of an electrode winding, which can exert considerable forces on adjacent battery cells.

The battery 10 further comprises a temperature-control apparatus for controlling the temperature of the battery cells $100_1, 100_2$. The temperature-control apparatus comprises temperature-control elements $400_1, 400_2$ which each comprise a channel for accommodating a temperature-control medium. The channels each comprise at least two ends which are each in the form of openings in the surfaces of the temperature-control elements $400_1, 400_2$. The channels can each be straight, or, in order to increase the level of heat exchange, can be of curved, meandering or wave-like, for example sinusoidal, design. The temperature-control elements $400_1, 400_2$ can, as shown in FIG. 1, be in the form of temperature-control plates on which the battery cells $100_1, 100_2$ are arranged. The temperature-control elements $400_1, 400_2$ can, in order to increase the level of heat exchange, comprise, for example, metal, such as aluminum.

The temperature-control apparatus further comprises connection apparatuses $500_1, 500_2$ and fastening devices. The connection apparatuses $500_1, 500_2$ each comprise a connection device $510_1, 510_2$, for example a connection body or connection block, and at least one channel having at least two ends, wherein in each case one of the ends is in the form of an opening in the surface of the connection device $510_1, 510_2$ and one of the ends is designed to receive a connecting line, for example is in the form of a hose connector, and are each fastened to the temperature-control elements $400_1, 400_2$ by means of the fastening devices in such a way that the openings in the connection devices $510_1, 510_2$ are each aligned with the openings in the temperature-control elements $400_1, 400_2$ and the temperature-control medium can in each case flow through the connection apparatuses $500_1, 500_2$ into the temperature-control elements $400_1, 400_2$ or out of the temperature-control elements $400_1, 400_2$. The fastening devices can, as shown by way of example in FIG. 1, be in the form of screws $700_{11}, 700_{12}, 700_{21}, 700_{22}$ which are screwed into threaded holes in the temperature-control elements $400_1$, $400_2$ through holes in the connection devices $510_1$, $510_2$. As an alternative, the connection apparatuses $500_1$, $500_2$ can be, for example, clipped, adhesively bonded, plug-connected or latched to the temperature-control elements $400_1$, $400_2$. The connection apparatuses $500_1$, $500_2$ can comprise, for example, plastic such as polycarbonate or polyamide. The connection apparatuses $500_1$, $500_2$ can each be integrally formed. The connection apparatuses $500_1$, $500_2$ can be produced, for example, in each case by means of molding, for example injection molding, such as plastic injection molding.

The temperature-control apparatus further comprises connecting lines $600_{11}$, $600_{12}$, $600_{21}$, $600_{22}$ for supplying or discharging the temperature-control medium. The connecting lines $600_{11}$, $600_{12}$, $600_{21}$, $600_{22}$ are each connected to the ends of the connection apparatuses $500_1$, $500_2$ for receiving the connecting lines. The connecting lines $600_{11}$, $600_{12}$, $600_{21}$, $600_{22}$ can be in the form of, for example, tubes, such as flexible tubes or pipes. The connecting lines $600_{11}$, $600_{12}$, $600_{21}$, $600_{22}$ can comprise a material which corresponds to the material of the connection apparatuses $500_1$, $500_2$ or is matched to the material of the connection apparatuses $500_1$, $500_2$. Since the connection apparatuses $500_1$, $500_2$ are each connected to the temperature-control elements $400_1$, $400_2$ in a fixed, reliable and defined manner (temperature-control element/connection apparatus interface), the connections between the connection apparatuses $500_1$, $500_2$ and the connecting lines $600_{11}$, $600_{12}$, $600_{21}$, $600_{22}$ can be matched to one another or optimized (connection apparatus/connecting line interface). Therefore, connecting systems or interfaces which have been tried out and/or certified, for example with respect to design and/or materials, can be used for the connection apparatus/connecting line interface. The connecting lines $600_{11}$, $600_{12}$, $600_{21}$, $600_{22}$ can comprise, for example, plastic, such as polycarbonate or polyamide.

The battery 10 can further comprise a housing 300, and the battery cells $100_1$, $100_2$ and the temperature-control apparatus can be arranged in an interior space in the housing 300.

A method for producing the temperature-control apparatus can comprise providing a temperature-control element $400_1$, $400_2$, providing and orienting a connection apparatus $500_1$, $500_2$, fastening the connection apparatus $500_1$, $500_2$ to the temperature-control element $400_1$, $400_2$, providing a connecting line $600_{11}$, $600_{12}$, $600_{21}$, $600_{22}$ and connecting the connecting line $600_{11}$, $600_{12}$, $600_{21}$, $600_{22}$ to the connection apparatus $500_1$, $500_2$, so that an opening in the connection device $510_1$, $510_2$ is aligned with an opening in the temperature-control element $400_1$, $400_2$ and a temperature-control medium can flow through the connection apparatuses $500_1$, $500_2$ into the temperature-control element $400_1$, $400_2$ or out of the temperature-control element $400_1$, $400_2$. The method can further comprise providing means for orienting the connection apparatus $500_1$, $500_2$ with respect to the temperature-control element $400_1$, $400_2$, for example such as guide devices or centering devices, such as centering lugs. The method can further comprise providing a seal, such as an annular and/or self-adhesive seal. In this case, the steps can be grouped and/or the order of the steps can be adapted.

A method for controlling the temperature of a battery cell $100_1$, $100_2$ can comprise exchanging (supplying or discharging) the temperature-control medium between the temperature-control element $400_1$, $400_2$ for controlling the temperature of the battery cell $100_1$, $100_2$ and the connecting line $600_1$, $600_2$ by means of the connection apparatus $500_1$, $500_2$ which is fastened to the temperature-control element $400_1$, $400_2$ and is connected to the connecting line $600_1$, $600_2$.

Figure 2:
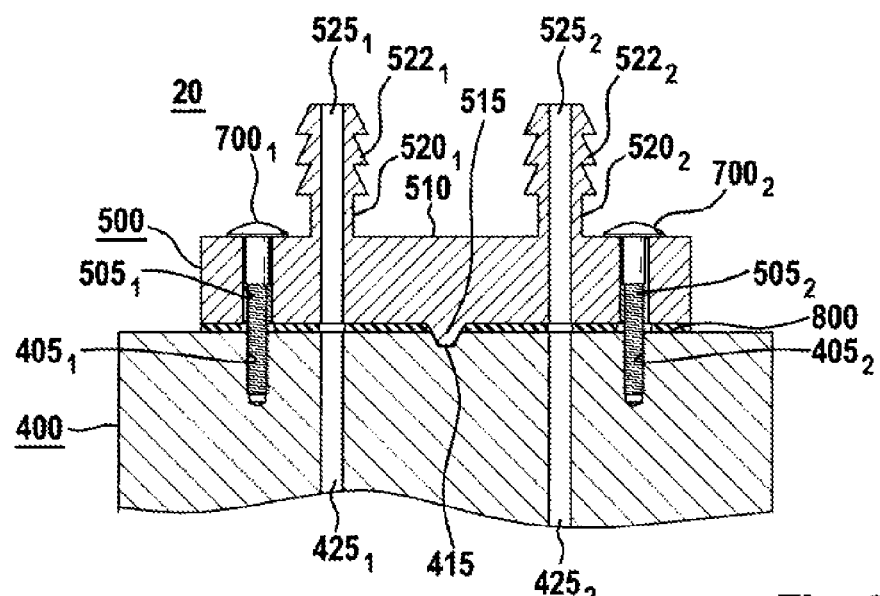
FIG. 2 shows, in section, a schematic view of a temperature-control apparatus 20 having a connection apparatus 500 according to another embodiment of the invention.

FIG. 2 shows, in section, a schematic view of a temperature-control apparatus 20 having a connection apparatus 500 according to another embodiment of the invention.

The temperature-control apparatus 20 comprises a temperature-control element 400 which comprises a channel for accommodating a temperature-control medium. The channel comprises two ends $425_1$, $425_2$ which are each in the form of openings in an end face of the temperature-control element 400. The channel can, as shown by way of example in FIG. 2, be of substantially straight design. The temperature-control element 400 further comprises threaded holes $405_1$, $405_2$. As shown by way of example in FIG. 2, two threaded holes $405_1$, $405_2$ can be arranged on the end face in such a way that the two openings are arranged between them.

The temperature-control apparatus 20 comprises a connection apparatus 500 comprising a connection device 510 and hose connectors $522_1$, $522_2$, which are spaced apart from one another, for connecting lines having channels $525_1$, $525_2$ which are each formed in the connection device 510 and one of the hose connectors $522_1$, $522_2$. The channels $525_1$, $525_2$ have openings in an end face of the connection device 510. The connection device 510 further comprises holes $505_1$, $505_2$ for fastening the connection apparatus 500 to the temperature-control element 400.

The temperature-control apparatus 20 further comprises fastening screws $700_1$, $700_2$. The fastening screws $700_1$, $700_2$ can, for example, be in the form of cylindrical screws, self-tapping screws or flow drill screws. As shown by way of example in FIG. 2, for the purpose of fastening the connection apparatus 500 to the temperature-control element 400, two round-head screws with a machine thread can project through the two holes $505_1$, $505_2$ in the connection device 510 and be screwed into the threaded holes $405_1$, $405_2$ in the temperature-control element 400 in such a way that the openings in the connection device 510 are each aligned with the openings in the temperature-control element 400 and the temperature-control medium can flow through the connection apparatus 500 into the temperature-control element 400 or out of the temperature-control element 400. The temperature-control apparatus 20 can comprise only one fastening screw.

The connection apparatus 500 and the temperature-control element 400 can further comprise corresponding guide devices for orienting the connection apparatus 500 on the temperature-control element 400 or for aligning the openings on the end faces of the connection apparatus 500 and of the temperature-control element 400. As shown by way of example in FIG. 2, the guide device of the connection device 510 can be in the form of a centering lug 515, which can be of conical or truncated-cone-like design, and the guide device of the temperature-control element 400 can be in the form of a corresponding centering hole 415. The connection apparatus 500 and the temperature-control element 400 can comprise a large number of corresponding guide devices, in particular when only one single fastening screw, which can be arranged centrally or in the middle, is provided for fastening the connection apparatus 500 to the temperature-control element 400, and therefore rotation of the connection apparatus 500 with respect to the temperature-control element 400 can also be prevented.

The temperature-control apparatus 20 can further comprise a seal 800. The seal 800 is arranged between the connection apparatus 500 and the temperature-control element 400. The connection apparatus 500 and/or the temperature-control element 400 can comprise a recess, for example a groove, for receiving the seal 800. The seal 800 can be of flat design and substantially fill the end face of the connection device 510. The seal 800 can comprise corresponding openings in the region of the channels 525$_1$, 525$_2$, fastening screws 700$_1$, 700$_2$ and/or possibly guide devices. The seal 800 can be in the form of a sealing ring, such as an O-Ring or expanding seal. The seal 800 can comprise, for example, rubber or plastic and/or be coated with an adhesive (on one side or on two sides). Therefore, the seal 800 can be connected, for example in advance, to the connection device 510 and/or be surrounded by the connection apparatus 500.

Figure 3:
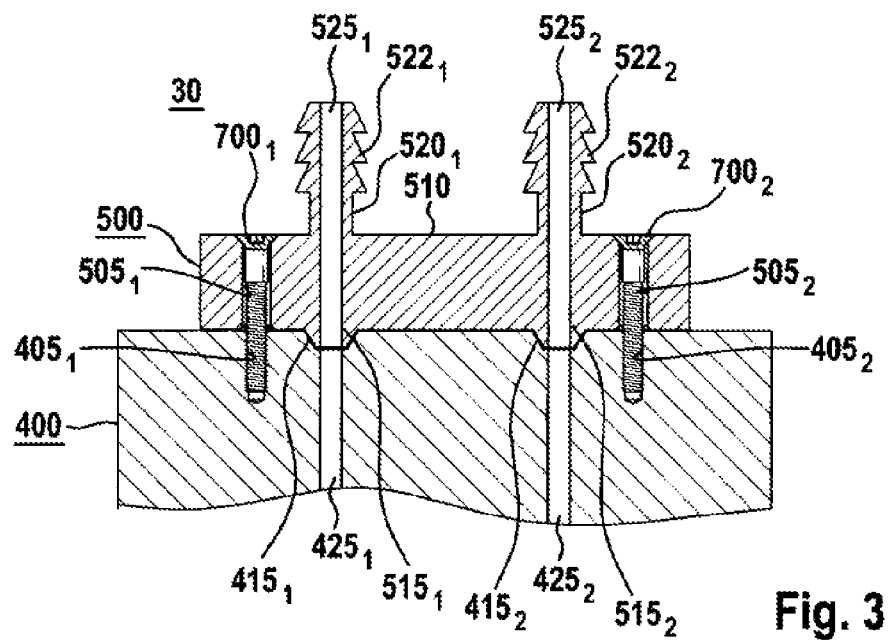
FIG. 3 shows, in section, a schematic view of a temperature-control apparatus 30 having a connection apparatus 500 according to a further embodiment of the invention.

FIG. 3 shows, in section, a schematic view of a temperature-control apparatus 30 having a connection apparatus 500 according to a further embodiment of the invention.

The temperature-control apparatus 30 corresponds substantially to the temperature-control apparatus 20 which is described with reference to FIG. 2.

As shown by way of example in FIG. 3, the holes 505$_1$, 505$_2$ of the connection device 510 can be recessed at one side, and therefore the fastening screws 700$_1$, 700$_2$ can, without projecting, be in the form of countersunk screws, for example countersunk screws with a machine thread and a hexagonal socket.

As is likewise shown by way of example in FIG. 3, the openings in the channels 425$_1$, 425$_2$, 525$_1$, 525$_2$ (interfaces) can be in the form of guide devices. To this end, in a first alternative, the openings in the end face of the temperature-control element 400, for example by comparatively simple recessing, can be in the form of recessed openings, and the openings in the end face of the connection device 510, for example by comparatively simple recessing in the case of an injection mold, can be in the form of truncated-cone-like openings which project from the end face of the connection device 510. In a second alternative, the openings in the end face of the temperature-control element 400 can be in the form of truncated-cone-like openings which project from the end face, and the openings in the end face of the connection device 510 can be in the form of recessed openings. In this case, the orientation of the connection apparatus 500 with respect to the temperature-control element 400 can be clearly defined by forming a first interface in accordance with the first alternative and one interface in accordance with the second alternative.

Figure 4:
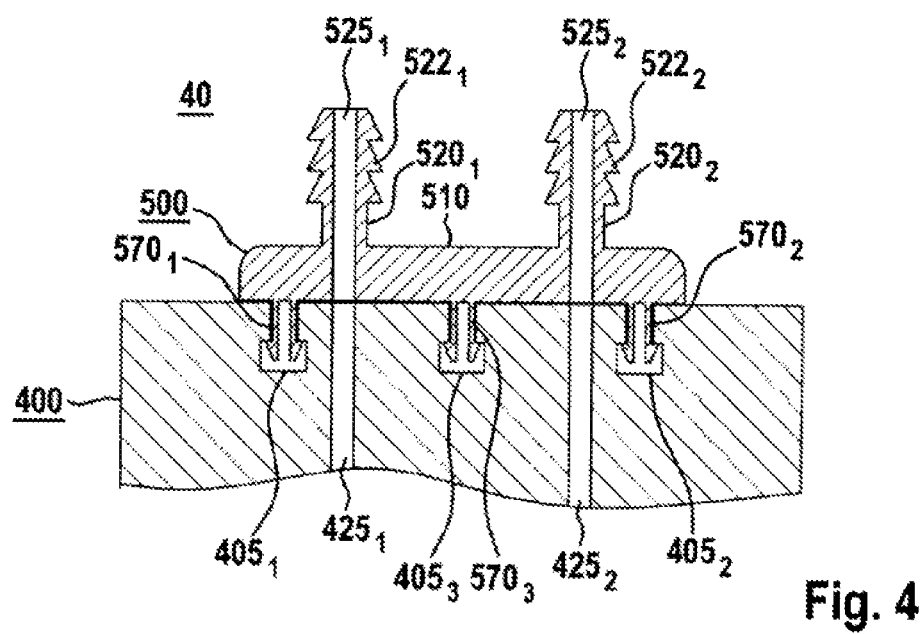
FIG. 4 shows, in section, a schematic view of a temperature-control apparatus 40 having a connection apparatus 500 according to yet another embodiment of the invention.

FIG. 4 shows, in section, a schematic view of a temperature-control apparatus 40 with a connection apparatus 500 according to yet another embodiment of the invention.

The temperature-control apparatus 40 corresponds substantially to the temperature-control apparatuses 20, 30 which are described with reference to FIGS. 2 and 3.

However, the connection apparatus 500, for the purpose of fastening the connection apparatus 500 to the temperature-control element 400, comprises fastening devices 570$_1$ . . . 570$_3$ which are formed on the end face of the connection device 510 at a distance from one another. The holes 405$_1$ . . . 405$_3$ in the temperature-control element 400 are, as shown by way of example in FIG. 4, designed to receive the fastening devices 570$_1$ . . . 570$_3$, in a manner corresponding with a set-back portion. Holes 405$_1$ . . . 405$_3$ can be of slot-like design for example, and therefore production of said holes is simplified. The fastening devices 570$_1$ . . . 570$_3$ can each be in the form of a latching arm or spring arm (clips) or, as shown by way of example in FIG. 4, in the form of twin latching arms or twin spring arms. As shown by way of example in FIG. 4, a latching arm comprises an elongate neck which is of spring-action design, and a wider head which is arranged at a free end of the neck and ends in an oblique face. A latching lug is formed at the free end of the neck, that is to say at a junction of the neck and the head, by means of an offset. When the latching arm is inserted into the hole, the latching lug can yield by means of the spring-action neck to the wall of the hole and latch into the set-back portion when said set-back portion is reached. The connection apparatus 500, comprising the connection device 510, the hose connectors 522$_1$, 522$_2$ and the fastening devices 570$_1$ . . . 570$_3$, can be integrally formed.

In conclusion, it should be noted that expressions such as "comprising" and "having" or the like do not preclude the possibility of further elements or steps being provided. Furthermore, it is pointed out that "a" or "one" does not preclude a large number. In addition, the features described in conjunction with the various embodiments can be combined with one another in any desired manner. Finally, it should be noted that the reference symbols in the claims are not intended to be interpreted as restricting the scope of protection of the claims.

The invention claimed is:

1. A connection apparatus (500; 500$_1$, 500$_2$) for controlling the temperature of a battery cell (100$_1$, 100$_2$), comprising:
   a temperature-control element (400; 400$_1$, 400$_2$), which comprises a channel for accommodating a temperature-control medium,
   a connection device (510; 510$_1$, 510$_2$), which comprises a channel for accommodating the temperature-control medium, for connection of a connecting line (600$_{11}$, 600$_{12}$, 600$_{21}$, 600$_{22}$) to an opening in the channel of the connection device (510; 510$_1$, 510$_2$), and
   a fastening device for fastening the connection device (510; 510$_1$, 510$_2$) to the temperature-control element (400; 400$_1$, 400$_2$),
   wherein the connection device (510; 510$_1$, 510$_2$) is configured to be fastened to the temperature-control element (400; 400$_1$, 400$_2$) in such a way that a further opening in the channel of the connection device (510; 510$_1$, 510$_2$) is aligned with an opening in the channel of the temperature-control element (400; 400$_1$, 400$_2$) and the temperature-control medium can flow through the connection device (510; 510$_1$, 510$_2$) into the temperature-control element (400; 400$_1$, 400$_2$) or out of the temperature-control element (400; 400$_1$, 400$_2$), and
   wherein a material of the connection device (510; 510$_1$, 510$_2$) is different from a material of the temperature-control element (400; 400$_1$, 400$_2$), and wherein the material of the connection device comprises plastics,
   the connection apparatus also comprises a centering lug (515) on one of the connection device (510; 510$_1$, 510$_2$) and the temperature control element (400; 400$_1$, 400$_2$), and a centering hole (415) on the other of the connection device (510; 510$_1$, 510$_2$) and the temperature control element (400; 400$_1$, 400$_2$), wherein the centering lug (515) fits into the centering hole (415) to orient the connection device (510; 510$_1$, 510$_2$) on the temperature control element (400; 400$_1$, 400$_2$).

2. The connection apparatus (500) according to claim 1, wherein:
   the fastening device comprises a latching arm (570$_1$, 570$_2$, 570$_3$).

3. The connection apparatus (500) according to claim 1, wherein:
   the connection device (510; 510$_1$, 510$_2$) is integrally formed.

4. The connection apparatus (500) according to claim 1, wherein:
the connection apparatus (500; 500₁, 500₂) is integrally formed.

5. The connection apparatus (500) according to claim 1, wherein the opening in the channel of the connection device (510; 510₁, 510₂) is positioned in the centering lug (515) and the opening in the channel of the temperature-control element (400; 400₁, 400₂) is positioned in the centering hole (415).

6. A temperature-control apparatus (20; 30; 40), comprising:
the connection apparatus (500; 500₁, 500₂) according to claim 1.

7. A battery module, comprising:
a battery cell (100₁, 100₂);
a connection apparatus (500; 500₁, 500₂) for controlling a temperature of the battery cell (100₁, 100₂);
a temperature-control element (400; 400₁, 400₂) including a channel for accommodating a temperature-control medium;
a connection device (510; 510₁, 510₂) including a channel for accommodating the temperature-control medium;
a connection line (600₁₁, 600₁₂, 600₂₁, 600₂₂) to connect to an opening in the channel of the connection device (510; 510₁, 510₂);
a fastening device for fastening the connection device (510; 510₁, 510₂) to the temperature-control element (400; 400₁, 400₂);
a centering lug (515) on one of the connection device (510; 510₁, 510₂) and the temperature control element (400; 400₁, 400₂), and
a centering hole (415) on the other of the connection device (510; 510₁, 510₂) and the temperature control element (400; 400₁, 400₂), wherein the centering lug (515) fits into the centering hole (415) to orient the connection device (510; 510₁, 510₂) on the temperature control element (400; 400₁, 400₂),
wherein the connection device (510; 510₁, 510₂) is configured to be fastened to the temperature-control element (400; 400₁, 400₂) in such a way that a further opening in the channel of the connection device (510; 510₁, 510₂) is aligned with an opening in the channel of the temperature-control element (400; 400₁, 400₂) and the temperature-control medium can flow through the connection device (510; 510₁, 510₂) into the temperature-control element (400; 400₁, 400₂) or out of the temperature-control element (400; 400₁, 400₂), and wherein the material of the connection device (510; 510₁, 510₂) is different from the material of the temperature-control element (400; 400₁, 400₂), and wherein the material of the connection device comprises plastics.

8. A battery pack, comprising:
the connection apparatus (500; 500₁, 500₂) according to claim 1.

9. A battery (10), comprising:
the connection apparatus (500; 500₁, 500₂) according to claim 1.

10. A battery system, comprising:
the connection apparatus (500; 500₁, 500₂) according to claim 1.

11. A vehicle, motor vehicle, electric motor vehicle or hybrid vehicle, comprising:
the connection apparatus (500; 500₁, 500₂) according to claim 1.

12. A method for controlling the temperature of a battery cell (100₁, 100₂), comprising:
providing a connection apparatus (500; 500₁, 500₂) comprising a fastening device for fastening the connection apparatus (500; 500₁, 500₂) to a temperature-control element (400; 400₁, 400₂) which comprises a channel for accommodating a temperature-control medium, and a connection device (510; 510₁, 510₂), which comprises a channel for accommodating the temperature-control medium, for connection of a connecting line (600₁₁, 600₁₂, 600₂₁, 600₂₂) to an opening in the channel of the connection device (510; 510₁, 510₂), wherein the connection device (510; 510₁, 510₂) is formed from a material that is different from a material of the temperature-control element (400; 400₁, 400₂), and wherein the material of the connection device comprises a plastic, and
fastening the connection device (510; 510₁, 510₂) to the temperature-control element (400; 400₁, 400₂) in such a way that a further opening in the channel of the connection device (510; 510₁, 510₂) is aligned with an opening in the channel of the temperature-control element (400; 400₁, 400₂) and the temperature-control medium can flow through the connection device (510; 510₁, 510₂) into the temperature-control element (400; 400₁, 400₂) or out of the temperature-control element (400; 400₁, 400₂),
providing a centering lug (515) and a centering hole (415), wherein one of the connection device (510; 510₁, 510₂) and the temperature-control element (400; 400₁, 400₂) includes the centering lug (515) and the other of the connection device (510; 510₁, 510₂) and the temperature-control element (400; 400₁, 400₂) includes the centering hole (415), and
fitting the centering lug (515) in the centering hole (415) to orient the connection device (510; 510₁, 510₂) on the temperature-control element (400; 400₁, 400₂).

13. The method according to claim 12, further comprising:
forming the fastening device with a latching arm (570₁, 570₂, 570₃).

14. The method according to claim 12, further comprising:
integrally forming the connection device (510; 510₁, 510₂).

15. The method according to claim 12, further comprising:
integrally forming the connection apparatus (500; 500₁, 500₂).

16. The method according to claim 12,
wherein the opening in the channel of the connection device (510; 510₁, 510₂) is positioned in the centering lug (515) and the opening in the channel of the temperature-control element (400; 400₁, 400₂) is positioned in the centering hole (415).

17. The connection apparatus (500) according to claim 7, wherein the opening in the channel of the connection device (510; 510₁, 510₂) is positioned in the centering lug (515) and the opening in the channel of the temperature-control element (400; 400₁, 400₂) is positioned in the centering hole (515).

* * * * *